(12) United States Patent
Fine et al.

(10) Patent No.: US 10,142,135 B2
(45) Date of Patent: *Nov. 27, 2018

(54) WIRELESS BACKHAUL

(71) Applicant: Maxlinear Asia Singapore PTE LTD, Singapore (SG)

(72) Inventors: Nadav Fine, Herzliyya (IL); Evgeny Levitan, Haifa (IL); Eran Ridel, Rosh Ha'aiyn (IL); Ran Soffer, Tel-Mond (IL); Uri Kanari, Herzeliya (IL); Nati Mizrahi, Giv'ataim (IL)

(73) Assignee: Maxlinear Asia Singapore PTE LTD, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/830,191

(22) Filed: Dec. 4, 2017

(65) Prior Publication Data
US 2018/0097666 A1    Apr. 5, 2018

Related U.S. Application Data

(63) Continuation of application No. 15/291,135, filed on Oct. 12, 2016, now Pat. No. 9,843,464.

(60) Provisional application No. 62/241,694, filed on Oct. 14, 2015.

(51) Int. Cl.
| | |
|---|---|
| *H03H 7/40* | (2006.01) |
| *H04L 25/03* | (2006.01) |
| *H04L 5/10* | (2006.01) |
| *H04L 5/00* | (2006.01) |

(52) U.S. Cl.
CPC ........ *H04L 25/03057* (2013.01); *H04L 5/005* (2013.01); *H04L 5/10* (2013.01); *H04L 25/03006* (2013.01)

(58) Field of Classification Search
CPC ..... H04L 25/03057; H04L 5/005; H04L 5/10; H04L 25/03006
USPC ........................................................ 375/233
See application file for complete search history.

(56) References Cited

U.S. PATENT DOCUMENTS

| | | | |
|---|---|---|---|
| 5,659,583 | A | 8/1997 | Lane |
| 5,777,692 | A | 7/1998 | Ghosh |
| 6,850,563 | B1 * | 2/2005 | Hulyalkar ............. H04L 1/0054 375/233 |
| 7,031,405 | B1 | 4/2006 | Touzni et al. |
| 9,455,847 | B1 * | 9/2016 | Chung ............. H04L 25/03057 |
| 9,843,464 | B2 | 12/2017 | Fine et al. |
| 2002/0044598 | A1 | 4/2002 | Frenkel et al. |
| 2002/0126748 | A1 | 9/2002 | Rafie et al. |

\* cited by examiner

*Primary Examiner* — Helene Tayong
(74) *Attorney, Agent, or Firm* — McAndrews, Held & Malloy, Ltd.

(57) ABSTRACT

In the subject system, a receiver includes a feed forward circuit, a phase recovery circuit, and a feedback circuit. The feed forward circuit compensates for near reflections and provides an input to the phase recovery circuit and the feedback circuit. The phase recovery circuit performs phase recovery and provides phase recovery information to the feedback circuit. The feedback circuit adjusts and/or corrects a received symbol based at least in part on the received phase recovery information.

21 Claims, 3 Drawing Sheets

WIRELESS BACKHAUL

PRIORITY CLAIM

This application is a continuation of U.S. patent application Ser. No. 15/291,135 filed Oct. 12, 2016 (now U.S. Pat. No. 9,843,464), which claims priority to U.S. provisional patent application 62/241,694 filed on Oct. 14, 2015. These applications are each hereby incorporated herein by reference.

TECHNICAL FIELD

The present description relates generally to wireless backhaul, including single carrier wireless backhaul.

BACKGROUND

There may be an increasing market demand for point-to-point and/or point-to-multipoint outdoor wireless backhauls which may experience reflections and/or diffractions in the communication channel.

BRIEF DESCRIPTION OF THE DRAWINGS

Certain features of the subject technology are set forth in the appended claims. However, for purpose of explanation, one or more implementations of the subject technology are set forth in the following figures.

DETAILED DESCRIPTION

Figure 1:
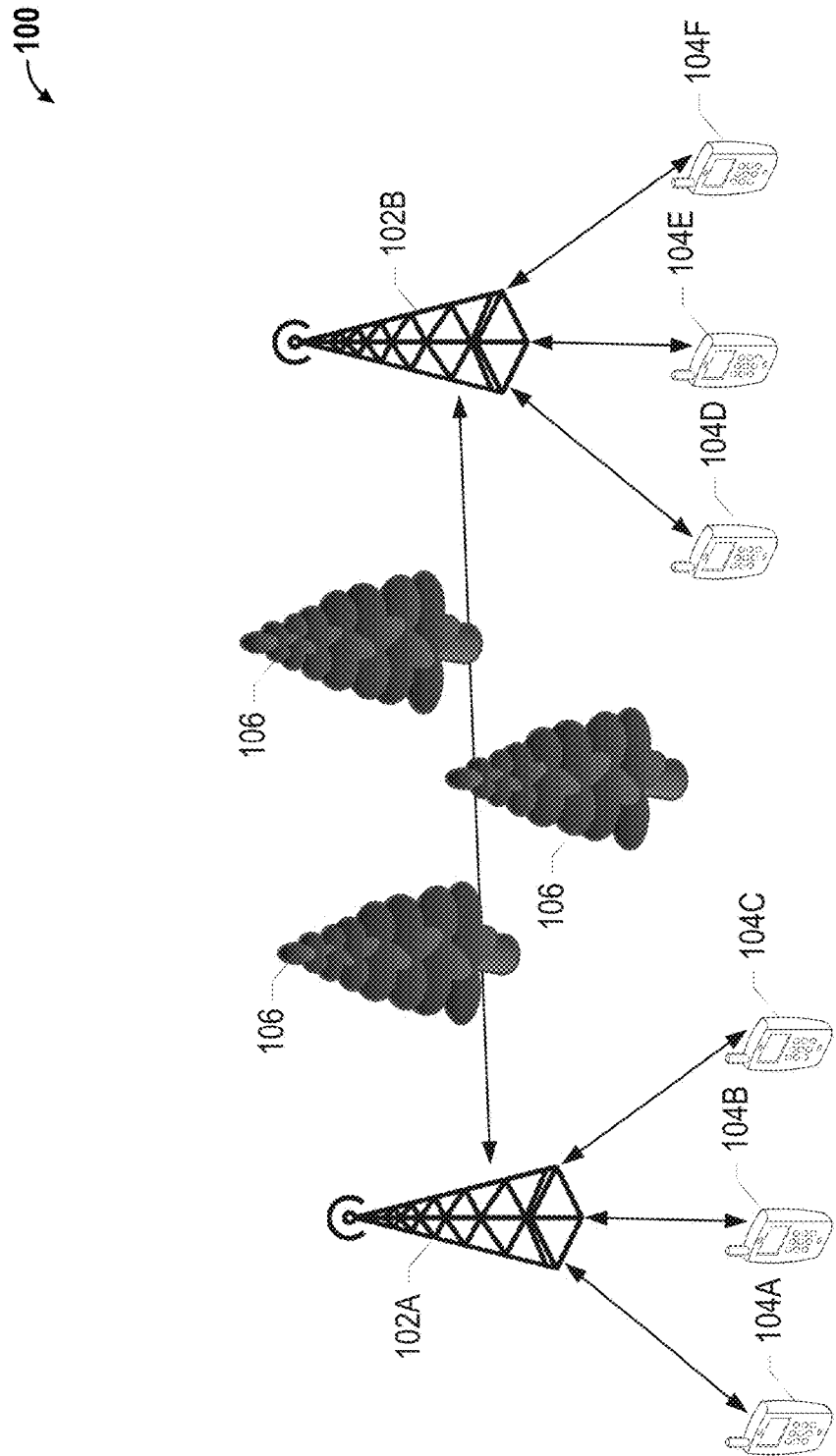
FIG. 1 illustrates an example network environment in which a wireless backhaul system may be implemented in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

There is a strong market demand for Point-to-Point (PtP) and Point-to-MultiPoint PtMP outdoor wireless backhaul systems. Traditional backhaul systems are designed for line-of-sight (LOS) scenarios. However, many environments may not allow a LOS implementation. In a non-LOS (NLOS) scenario, backhaul systems may experience reflections and diffractions in the channel.

PtP/PtMP backhaul links may run at 6 GHz to 86 GHz. These links require high availability at high modulation order while remaining low cost. Therefore, issues like analog parts cost and power consumption should be treated carefully. As the spectrum resource is very limited, pushing the spectral efficiency to the maximum is of high importance. PtP/PtMP links for backhaul applications are traditionally implemented over single carrier (SC). Thus, an SC solution may enable easy market penetration.

While the demand for wireless backhaul links under diffractions and reflections conditions is dramatically increased, there are no optimized solutions for these applications. One of the main challenges is the phase noise, which may impose high cost and high power consumption on the solution. Therefore, the scenario of reflection/diffraction along with phase noise is of interest.

Following is a summary of relevant PtP/PtMP diffractions/reflections link characterizations for backhaul:

|  | Microwave (μWave) | Millimeter wave (mmWave) |
| --- | --- | --- |
| Channel | 6 GHz-42 GHz | 71 GHz-86 GHz |
| Baud rate | up to 112 MBaud | up to 250 MBaud |
| Payload rate | up to 500 Mbps | up to 1 Gbps |

The single carrier receiver described herein may be applicable for 1 μsec reflections and high order modulation (e.g., 256 QAM) in the presence of phase noise. The silicon size and the power consumption of the receiver are a function of the equalizer length and the width of the taps. Under typical backhaul scenarios, the equalizer length may be on the order of 3,000 symbols for mmWave baud rates and on the order of 300 symbols for μWave baud rates. The single carrier receiver described herein may reduce the equalizer length, while being less sensitive to loop-delay due to carrier recovery for phase noise.

FIG. 1 illustrates an example network environment 100 in which a wireless backhaul system may be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The network environment 100 includes one or more base stations 102A-B, one or more wireless devices 104A-F, and one or more physical objects 106. The base stations 102A-B may communicate with one or more of the wireless devices 104A-F via one or more wireless networking technologies, such as cellular (e.g., LTE), WiFi (e.g., 802.11), millimeter wave (e.g. 60 GHz), or generally any wireless networking technology. The base stations 102A-B may communicate with each other via a wireless backhaul link, such as via microwave, millimeter wave, or generally any wireless communications, such as wireless communications in the 6 GHz to 86 GHz frequency range.

The network environment 100 may include one or more physical objects 106 that may cause reflections, refractions, and/or diffractions in the wireless backhaul signals communicated between the base stations 102A-B. The physical objects 106 may include, for example, trees, buildings, lakes, rivers, mountains, or generally any physical object that may lie between the base stations 102A-B. The reflections, refractions, and/or diffractions caused by the one or more physical objects 106 may introduce phase noise into the signals transmitted between the base stations 102A-B.

In the subject system, the base stations 102A-B may be and/or may include a single carrier receiver that tolerates reflection, refraction, and/or diffraction and phase noise conditions under high modulation order, e.g. in a wireless backhaul. The receiver includes an equalizer that is based on a decision-feedback equalization (DFE). An additional auxiliary branch may be added to implement the phase noise recovery. The additional auxiliary branch may also overcome the long delay associated with phase noise recovery implementation.

Figure 2:
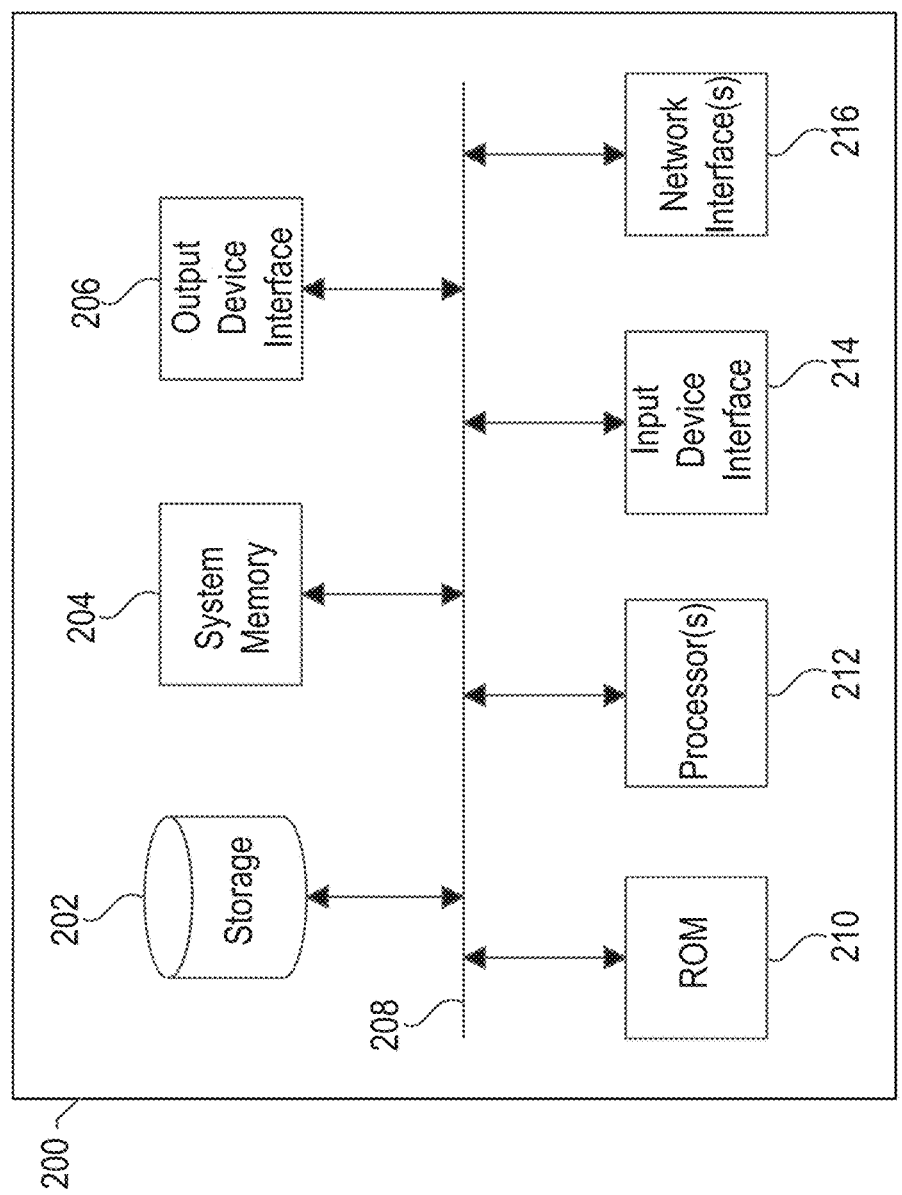
FIG. 2 illustrates an electronic system with which any implementations of the subject technology are implemented.

FIG. 2 conceptually illustrates an electronic system 200 with which one or more implementations of the subject technology may be implemented. The electronic system 200, for example, can be a desktop computer, a laptop computer, a tablet computer, a station, a server, a switch, a router, a base station, a receiver, a phone, a user equipment, or generally any electronic device that transmits signals over a network. Such an electronic system 200 includes various types of computer readable media and interfaces for various other types of computer readable media. The electronic system 200 includes a bus 208, one or more processing unit(s) 212, a system memory 204, a read-only memory (ROM) 210, a permanent storage device 202, an input device interface 214, an output device interface 206, and a network interface 216, or subsets and variations thereof.

The bus 208 collectively represents all system, peripheral, and chipset buses that communicatively connect the numerous internal devices of the electronic system 200. In one or more implementations, the bus 208 communicatively connects the one or more processing unit(s) 212 with the ROM 210, the system memory 204, and the permanent storage device 202. From these various memory units, the one or more processing unit(s) 212 retrieves instructions to execute and data to process in order to execute the processes of the subject disclosure. The one or more processing unit(s) 212 can be a single processor or a multi-core processor in different implementations.

The ROM 210 stores static data and instructions that are needed by the one or more processing unit(s) 212 and other modules of the electronic system. The permanent storage device 202, on the other hand, is a read-and-write memory device. The permanent storage device 202 is a non-volatile memory unit that stores instructions and data even when the electronic system 200 is off. One or more implementations of the subject disclosure use a mass-storage device (such as a magnetic or optical disk and its corresponding disk drive) as the permanent storage device 202.

Other implementations use a removable storage device (such as a removable disk, flash drive, etc., and its corresponding disk drive or disk receptacle) as the permanent storage device 202. Like the permanent storage device 202, the system memory 204 is a read-and-write memory device. However, unlike the permanent storage device 202, the system memory 204 is a volatile read-and-write memory, such as random access memory. System memory 204 stores any of the instructions and data that the one or more processing unit(s) 212 needs at runtime. In one or more implementations, the processes of the subject disclosure are stored in the system memory 204, the permanent storage device 202, and/or the ROM 210. From these various memory units, the one or more processing unit(s) 212 retrieves instructions to execute and data to process in order to execute the processes of one or more implementations.

The bus 208 also connects to the input device interface 214 and the output device interface 206. The input device interface 214 enables a user to communicate information and select commands to the electronic system. Input devices used with the input device interface 214 include, for example, alphanumeric keyboards and pointing devices (also called "cursor control devices"). The output device interface 206 enables, for example, the display of images generated by the electronic system 200. Output devices used with the output device interface 206 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 2, the bus 208 also couples the electronic system 200 to one or more networks (not shown) through one or more network interfaces 216. In this manner, the computer can be a part of one or more network of computers (such as a local area network ("LAN"), a wide area network ("WAN"), or an Intranet, or a network of networks, such as the Internet. Any or all components of the electronic system 200 can be used in conjunction with the subject disclosure.

Figure 3:
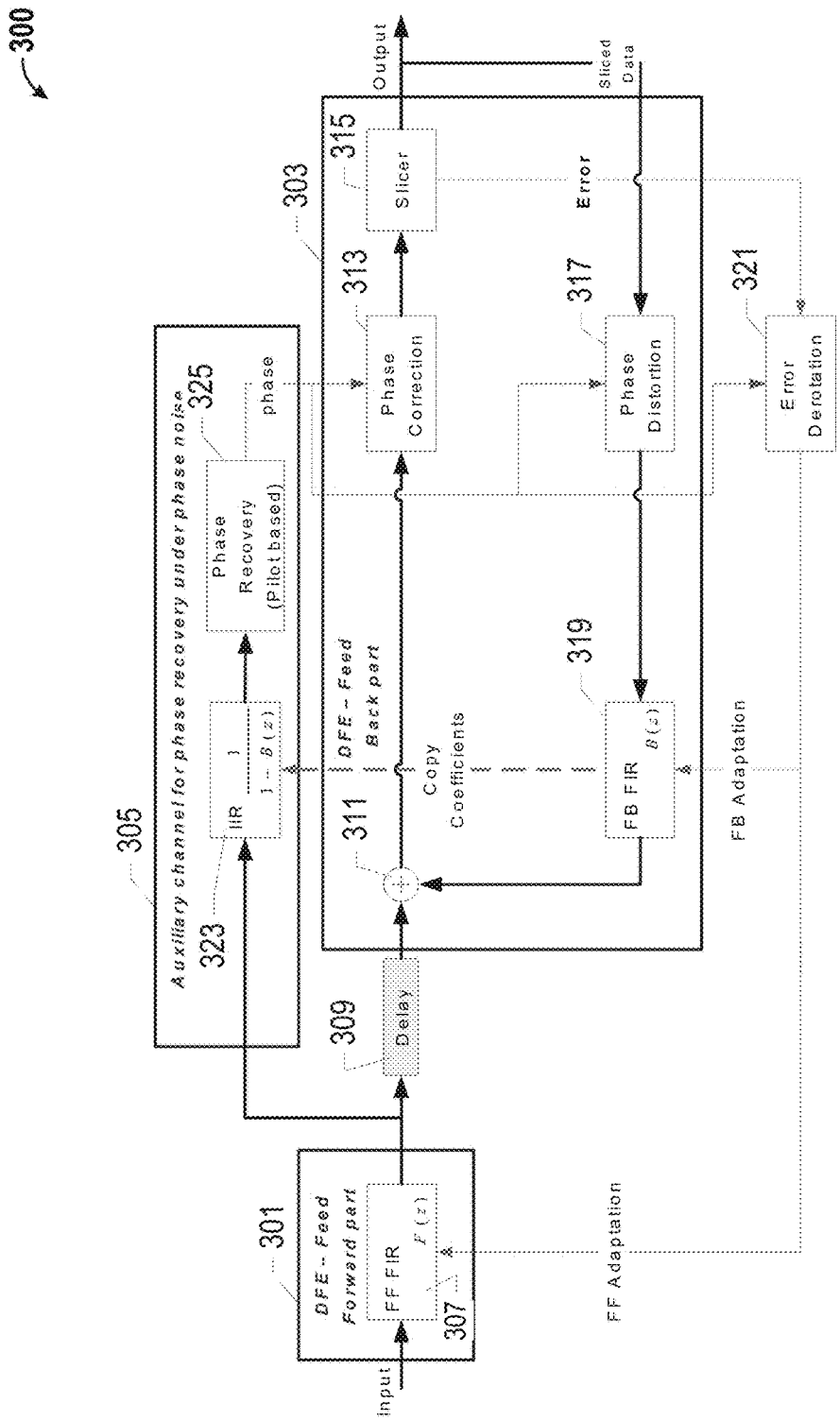
FIG. 3 illustrates an example receiver in accordance with one or more implementations.

FIG. 3 illustrates an example receiver 300 in accordance with one or more implementations. The input to the receiver 300 may be based on a transmitted symbol (i.e., a current symbol). The input to the receiver 300 may also comprise inter-symbol interference (ISI) based on a contribution from one or more past symbols and/or a contribution from one or more future symbols. The input to the receiver 300 may also comprise a phase rotation.

The first element in the link correction may be implemented by the DFE-Feed Forward (FF) portion 301. This portion may be a FF Filter (FFF) 307 that handles the very near reflections. The FFF 307 may also compensate for the impairments that result from the HW implementation. The taps of the FFF 307 may be trained, adapted, and/or determined a priori, such that the contribution from the one or more future symbols is reduced (e.g., by zero-forcing one or more taps of a channel model). The output of the FFF 307 may then split into two branches: the DFE-Feed Back (FB) portion 303 and an auxiliary branch 305 for phase recovery.

The auxiliary branch 305 may include an infinite impulse response (IIR) filter 323 and a phase recovery circuit 325. The IIR filter 323 compensates for post reflections and reduces the contribution from the one or more past symbols. The phase recovery circuit 325 may recover the phase of the signal output from the HR filter 323 based on a known pilot. The recovered phase may be used by the DFE-FB 303.

The interface to the DFE-FB 303 may be through a delay line 309. The delay line 309 may coordinate the timing of the phase from the auxiliary branch 305 with the current symbol. The DFE-FB 303 may comprise a reflection removal circuit 311, a phase correction circuit 313, a data slicer 315, a phase distortion circuit 317 and a FB filter (FBF) 319.

The reflection removal circuit 311 subtracts an estimated contribution from past symbols from the delayed output of the FFF 301. The estimated contribution from past symbols may by formed by adding phase distortion to estimated data symbols and filtering the phase distorted data symbols. The estimated data symbols may be distorted by the recovered phase from the auxiliary branch 305 by using a phase distortion circuit 317. The rotated data symbols are then filtered by the FBF 317. The filtered rotated data symbols may be subtracted from the output of the delay line 309.

After the reflection removal circuit 311, a phase correction may be applied according to the recovered phase from the auxiliary branch 305 by using the phase correction circuit 313. The data slicer 315 may be used to determine the data symbols that are used for reflection removal as described above. The data symbols may also be sent to the next stage of the receiver from the output of the DFE-FB portion 303.

The slicer 315 may also determine a residual error signal that may correspond to a channel estimate of the signal at the input to the slicer 315. The residual error signal that may be sent to an error derotation circuit 321 and used for adaptation of the FFF 307, the FBF 319 and the BR filter 323. The taps of FFF 307 may be adapted in view of the residual error signal in order to further reduce the contribution from the one or more future symbols. The taps of FBF 319 may be adapted in view of the residual error signal in order to further reduce the contribution from the one or more past symbols. The HR filter 323 taps may be the inverse of the FBF 307. For example, the IIR(z) filter 323 may be represented as $1/(1-B(z))$, where $B(z)$ corresponds to the FBF 319 taps. The error derotation circuit 321 may use the recovered phase from the auxiliary branch 305 to reverse the rotation on the residual error signal resulting from the phase correction circuit 313.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the Hocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device. As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" When executing a second one or more lines of code.

As used herein, the phrase "at least one of" or "one or more of" preceding a series of items, with the term "and" or "or" to separate any of the items, modifies the list as a whole, rather than each member of the list (e.g., each item). The phrase "at least one of" or "one or more of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

The predicate words "configured to", "operable to", and "programmed to" do not imply any particular tangible or intangible modification of a subject, hut, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A receiver comprising:
   a feedforward circuit comprising a first adaptive filter;
   a feedback circuit comprising a second adaptive filter, wherein the feedback circuit is operable to adjust a current symbol according to phase recovery information; and
   a phase recovery circuit comprising a third adaptive filter, wherein the phase recovery circuit is operable to generate the phase recovery information according to an output from the feedforward circuit, and wherein one or more taps of the third adaptive filter are based on one or more taps of the second adaptive filter.

2. The receiver of claim 1, wherein the first adaptive filter comprises a finite impulse response (FIR) filter.

3. The receiver of claim 1, wherein the second adaptive filter comprises a finite impulse response (FIR) filter.

4. The receiver of claim 1, wherein the third adaptive filter comprises an impulse response (IIR) filter.

5. The receiver of claim 1, wherein an adaptation of the first adaptive filter is based on a residual error from a data slicer.

6. The receiver of claim 1, wherein an adaptation of the first adaptive filter is based on the phase recovery information.

7. The receiver of claim 1, wherein the feedforward circuit is operable to reduce inter-symbol interference from a future symbol.

8. The receiver of claim 1, wherein an adaptation of the second adaptive filter is based on a residual error from a data slicer.

9. The receiver of claim 1, wherein an adaptation of the second adaptive filter is based on the phase recovery information.

10. The receiver of claim 1, wherein the feedback circuit is operable to reduce inter-symbol interference from a past symbol.

11. The receiver of claim 1, wherein an adaptation of the third adaptive filter is based on a residual error from a data slicer.

12. The receiver of claim 1, wherein the phase recovery information is determined based on a predetermined pilot.

13. The receiver of claim 1, wherein the phase recovery information comprises a phase rotation of the current symbol.

14. The receiver of claim 1, wherein a delay between the feedforward circuit and the feedback circuit aligns symbol timing in the feedback circuit with the phase recovery circuit.

15. A receiver comprising:
    a reflection removal circuit operable to remove an estimated inter-symbol interference (ISI) from a wireless signal, wherein the reflection removal circuit comprises a first adaptive filter;
    a phase correction circuit operable to rotate the wireless signal by an estimated phase, wherein the phase correction circuit comprises a second adaptive filter, and wherein one or more taps of the second adaptive filter are based on one or more taps of the first adaptive filter;

a slicer operably coupled to the reflection removal circuit and the phase correction circuit, wherein the slicer is operable to estimate a channel and a series of symbols in the wireless signal; and a phase distortion circuit operable to distort the series of symbols according to the estimated phase, wherein the phase correction circuit is operable to generate the estimated ISI according to the distorted series of symbols and the channel estimate.

16. The receiver of claim 15, wherein the first adaptive filter comprises a finite impulse response (FIR) filter.

17. The receiver of claim 15, wherein the second adaptive filter comprises a finite impulse response (FIR) filter.

18. A receiver comprising:

a reflection removal circuit operable to remove an estimated inter-symbol interference (ISI) from a signal received over a wireless channel, wherein the reflection removal circuit comprises a first adaptive filter, and wherein the first adaptive filter is adapted according to a channel estimate;

a phase recovery circuit operable to estimate a phase introduced by the wireless channel, wherein the phase recovery circuit comprises a second adaptive filter, and wherein one or more taps of the second adaptive filter are based on one or more taps of the first adaptive filter;

a phase correction circuit operable to rotate the signal received over the wireless channel by the estimated phase; and a slicer operably coupled to the reflection removal circuit and the phase correction circuit, wherein the slicer is operable to generate the channel estimate and predict a series of symbols in the wireless signal, and wherein the estimated ISI is based on the series of symbols in the wireless signal.

19. The receiver of claim 18, wherein the first adaptive filter comprises a finite impulse response (FIR) filter.

20. The receiver of claim 18, wherein the second adaptive filter comprises a finite impulse response (FIR) filter.

21. The receiver of claim 18, wherein the estimated ISI is distorted by the estimated phase.

* * * * *